(12) United States Patent
Yang

(10) Patent No.: US 11,479,136 B2
(45) Date of Patent: Oct. 25, 2022

(54) APPARATUS AND METHOD FOR AUTOMATICALLY CHARGING A VEHICLE

(71) Applicants: HYUNDAI MOTOR COMPANY, Seoul (KR); KIA MOTORS CORPORATION, Seoul (KR)

(72) Inventor: Jae Ho Yang, Cheonan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 298 days.

(21) Appl. No.: 16/839,493

(22) Filed: Apr. 3, 2020

(65) Prior Publication Data

US 2021/0094431 A1 Apr. 1, 2021

(30) Foreign Application Priority Data

Sep. 30, 2019 (KR) .................. 10-2019-0121028

(51) Int. Cl.
| | |
|---|---|
| *B60L 53/37* | (2019.01) |
| *B60L 53/16* | (2019.01) |
| *B60L 53/30* | (2019.01) |
| *B60L 53/65* | (2019.01) |
| *H02J 7/00* | (2006.01) |
| *B60L 50/60* | (2019.01) |
| *B60K 6/28* | (2007.10) |

(52) U.S. Cl.
CPC ............. *B60L 53/37* (2019.02); *B60L 50/60* (2019.02); *B60L 53/16* (2019.02); *B60L 53/305* (2019.02); *B60L 53/65* (2019.02); *H02J 7/0045* (2013.01); *B60K 6/28* (2013.01); *B60Y 2200/91* (2013.01); *B60Y 2200/92* (2013.01); *B60Y 2300/91* (2013.01)

(58) Field of Classification Search
CPC ........................................................ B60L 53/37
USPC ........................................................ 320/109
See application file for complete search history.

(56) References Cited

U.S. PATENT DOCUMENTS

| | | | |
|---|---|---|---|
| 7,999,506 B1 * | 8/2011 | Hollar ..................... | B60L 53/34 |
| | | | 320/109 |
| 8,169,186 B1 * | 5/2012 | Haddad ................... | B60L 53/65 |
| | | | 180/205.1 |
| 9,873,346 B2 * | 1/2018 | Maekawa ............... | B60L 53/36 |

(Continued)

FOREIGN PATENT DOCUMENTS

JP 2011257914 A 12/2011

*Primary Examiner* — Jerry D Robbins
(74) *Attorney, Agent, or Firm* — Lempia Summerfield Katz LLC

(57) ABSTRACT

An apparatus and a method for automatically charging a vehicle include a charging plug to connect to a charging port of the vehicle, a manipulator to move the charging plug to the charging port of the vehicle, a power supply connected with the charging plug to supply charging power to the vehicle, and a processor. The processor obtains vehicle information and parking information through communication with the vehicle when recognizing parking of the vehicle, calculates a vehicle position using the vehicle information and the parking information, recognizes the charging port of the vehicle based on the calculated vehicle position, and controls the manipulator to connect the charging plug to the charging port of the vehicle such that a battery of the vehicle is charged.

20 Claims, 6 Drawing Sheets

(56) References Cited

U.S. PATENT DOCUMENTS

| | | | |
|---|---|---|---|
| 2014/0111155 A1* | 4/2014 | Bendicks | H02J 50/90 |
| | | | 320/108 |
| 2015/0061576 A1* | 3/2015 | Chen | B60L 53/37 |
| | | | 320/108 |
| 2017/0001527 A1* | 1/2017 | Prokhorov | B60L 53/65 |
| 2018/0056801 A1* | 3/2018 | Leary | B60L 53/305 |
| 2020/0139843 A1* | 5/2020 | Park | B60L 53/36 |
| 2021/0061116 A1* | 3/2021 | Lin | B60L 53/37 |

* cited by examiner

APPARATUS AND METHOD FOR AUTOMATICALLY CHARGING A VEHICLE

CROSS-REFERENCE TO RELATED APPLICATION

This application claims the benefit of priority to Korean Patent Application No. 10-2019-0121028, filed in the Korean Intellectual Property Office on Sep. 30, 2019, the entire contents of which are incorporated herein by reference.

TECHNICAL FIELD

The present disclosure relates to an apparatus and a method for automatically charging a vehicle.

BACKGROUND

With the development of robotics, robots have been utilized in various fields. For example, the robots include industrial robots, medical robots, service robots, meteorological robots, fire suppression robots, space exploration robots, and military robots. These robots perform tasks using manipulators, which have functions similar to those of human arms or hands by electrical and mechanical mechanisms to move objects Recently, as robots are applied to charging fields of electric vehicles, charging robots to charge the electric vehicles with power have been introduced. The charging robot recognizes a charging port of a vehicle using a sensor (for example, a camera) mounted on the robot. The charging robot connects a charging connector provided at the end of a robotic arm to the recognized charging port. By such a structure, the battery of the electric vehicle is charged with power. Such a conventional charging robot excessively requires degrees of freedom to find the positions of various charging ports based on vehicle models. In addition, the conventional charging robot additionally requires a precise recognition sensor to exactly recognize various charging ports based on the vehicle models.

SUMMARY

The present disclosure has been made to solve the above-mentioned problems occurring in the prior art while advantages achieved by the prior art are maintained intact.

An aspect of the present disclosure provides an apparatus and a method for automatically charging a vehicle, capable of recognizing a charging port based on data measured by sensors mounted on the vehicle. The apparatus and the method are also capable of controlling a manipulator and connecting a charging plug to the recognized charging port to charge a battery of the vehicle.

The technical problems to be solved by the present inventive concept are not limited to the aforementioned problems. Any other technical problems not mentioned herein should be clearly understood from the following description by those having ordinary skill in the art to which the present disclosure pertains.

According to an aspect of the present disclosure, an apparatus for automatically charging a vehicle includes a charging plug configured to connect to a charging port of the vehicle. The apparatus further includes a manipulator configured to move the charging plug to the charging port of the vehicle. The apparatus further includes a power supply connected with the charging plug and configured to supply charging power to the vehicle. The apparatus further includes a processor configured to obtain vehicle information and parking information through a communication with the vehicle when recognizing parking of the vehicle. The processor is further configured to calculate a vehicle position using the vehicle information and the parking information. The processor is further configured to recognize the charging port of the vehicle based on the calculated vehicle position and to control the manipulator to connect the charging plug to the charging port of the vehicle such that a battery of the vehicle is charged.

The processor is further configured to recognize that the vehicle is parked in a preset parking space through sensors mounted in at least one of the vehicle or an infrastructure.

The vehicle is configured to calculate a relative position of the vehicle with respect to a reference position of the preset parking space using sensors mounted in a vehicle body. The vehicle is further configured to provide the calculated relative position of the vehicle to the processor.

The processor is further configured to calculate the vehicle position by using the calculated relative position of the vehicle and a position of the apparatus based on the reference position of the preset parking space. The reference position of the preset parking space is previously stored.

The processor is further configured to calculate a position relationship between the charging port of the vehicle and the apparatus using the vehicle position and a charging port position of the vehicle.

The processor is further configured to select an initial position for the charging of the battery of the vehicle based on the vehicle position and control the manipulator to move the charging plug to the initial position.

The processor is further configured to calculate an optimal trajectory from the initial position to a previously stored position of a charging port cover, based on the position of the charging port cover. The processor is further configured to control the manipulator along the optimal trajectory to move the charging plug to the position of the charging port cover.

The processor is further configured to move the manipulator to the initial position at a first moving speed. The processor is further configured to move the manipulator to the position of the charging port cover from the initial position at a second moving speed slower than the first moving speed.

The processor is further configured to recognize the charging port cover through a camera mounted at an end portion of the manipulator. The processor is further configured to request the vehicle to open the charging port cover. The processor is further configured to recognize a position and a connection angle of the charging port of the vehicle.

The vehicle information includes at least one of vehicle identification information, a vehicle model, a position of a charging port cover, a shape of the charging port cover, a position of the charging port of the vehicle, or a type of the charging port of the vehicle.

The parking information includes a parking position and a parking posture.

According to another aspect of the present disclosure, an apparatus for automatically charging a vehicle, includes a charging plug configured to connect to a charging port of the vehicle. The apparatus further includes a manipulator configured to move the charging plug to the charging port of the vehicle. The apparatus further includes a power supply connected with the charging plug and configured to supply charging power to the vehicle. The apparatus further includes a processor configured to obtain vehicle information through a communication with the vehicle when recognizing parking of the vehicle and parking information through communication an infrastructure. The processor is further configured to calculate a vehicle position using the vehicle information and the parking information. The processor is further configured to recognize the charging port based on the calculated vehicle position. The processor is further configured to control the manipulator to connect the charging plug to the charging port of the vehicle such that a battery of the vehicle is charged.

According to another aspect of the present disclosure, a method for automatically charging a vehicle includes recognizing, by a processor, parking of the vehicle. The method further includes obtaining, by the processor, vehicle information and parking information through communication with the vehicle. The method further includes calculating, by the processor, a vehicle position using the vehicle information and the parking information. The method further includes recognizing, by the processor, a charging port of the vehicle based on the calculated vehicle position. The method further includes controlling, by the processor, a manipulator to connect a charging plug to the charging port of the vehicle such that a battery of the vehicle is charged.

The recognizing of the parking includes recognizing, by the processor, that the vehicle is parked in a preset parking space through sensors mounted in at least one of the vehicle or an infrastructure.

The obtaining of the vehicle information and the parking information includes calculating, by the vehicle, a relative position of the vehicle with respect to a reference position of the parking space using sensors mounted in a vehicle body. The obtaining of the vehicle information and the parking information further includes providing the calculated relative position of the vehicle to the processor.

The calculating of the vehicle position includes calculating, by the processor, the vehicle position by using the relative position of the vehicle and a position of an apparatus, which includes the processor, based on the reference position of the preset parking space. The reference position of the preset parking space is previously stored.

The recognizing of the charging port of the vehicle includes calculating, by the processor, a position relationship between the charging port of the vehicle and the apparatus using the vehicle position and a charging port position of the vehicle.

The recognizing of the charging port of the vehicle includes selecting, by the processor, an initial position for the charging of the battery of the vehicle based on the vehicle position. The recognizing of the charging port of the vehicle further includes controlling the manipulator to move the charging plug to the initial position and recognizing a charging port cover through a camera mounted at an end portion of the manipulator. The recognizing of the charging port of the vehicle further includes requesting the vehicle to open the charging port cover and recognizing a position and a connection angle of the charging port of the vehicle when the charging port cover is opened.

The recognizing of the charging port cover includes calculating an optimal trajectory from the initial position to a previously stored position of the charging port cover based on the position of the charging port cover. The recognizing of the charging port cover further includes controlling the manipulator along the optimal trajectory to move the charging plug to the position of the charging port cover.

The vehicle information includes at least one of vehicle identification information, a vehicle model, a position of a charging port cover, a shape of the charging port cover, a position of the charging port of the vehicle, or a type of the charging port of the vehicle.

The parking information includes a parking position and a parking posture.

The method further includes stopping, by the processor, supplying charging power when the processor receives a full charging signal from the vehicle after charging the battery of the vehicle. The method further includes controlling the manipulator to remove the charging plug from the charging port of the vehicle.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
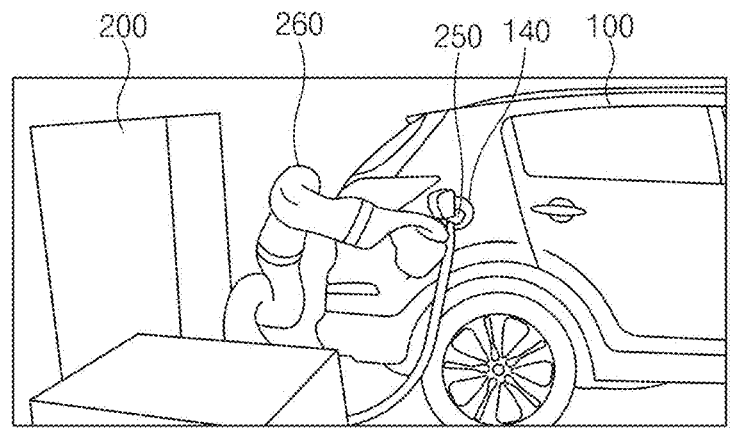
FIG. 1 is a view illustrating a configuration of a vehicle charging system, according to an embodiment of the present disclosure.
Figure 2:
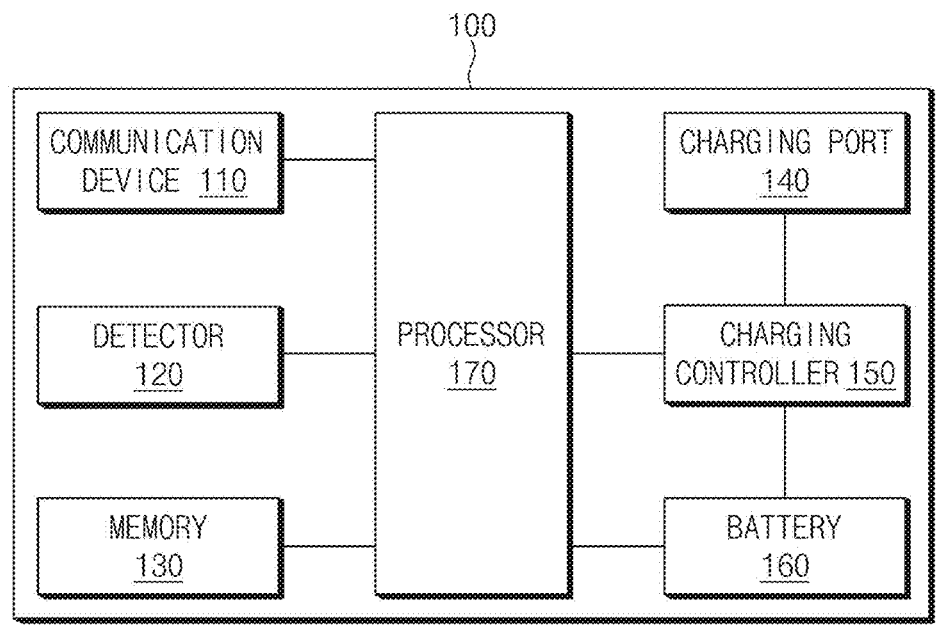
FIG. 2 is a block diagram illustrating a vehicle illustrated in FIG. 1.
Figure 3:
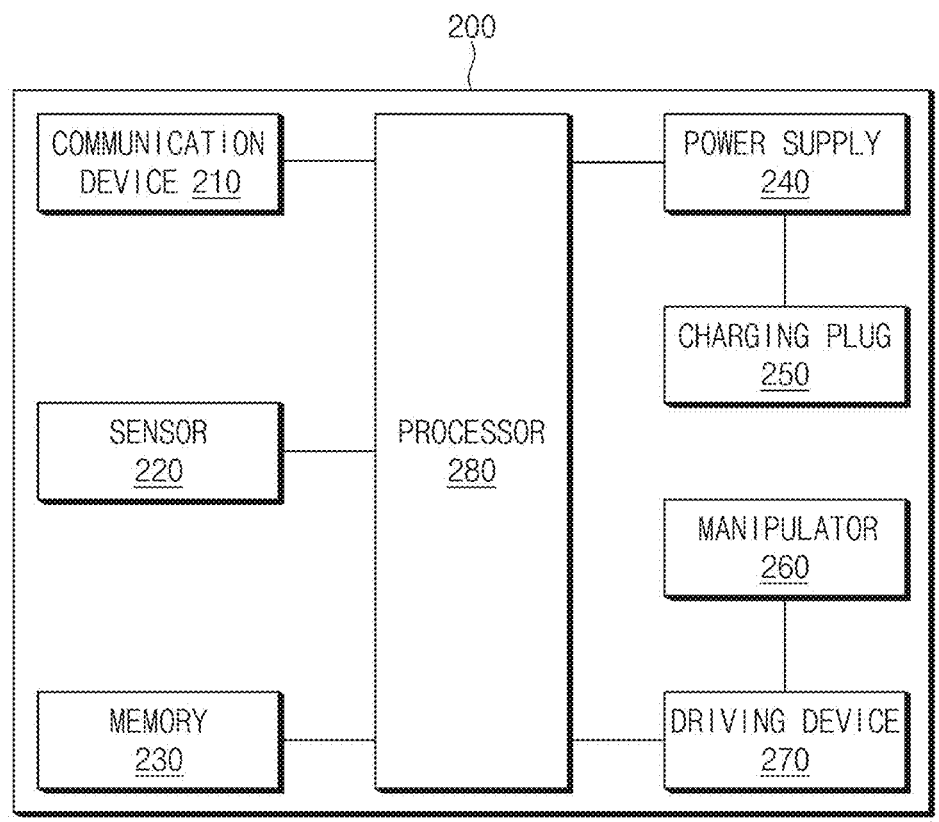
FIG. 3 is a block diagram illustrating an apparatus for automatically charging the vehicle illustrated in FIG. 1.

Hereinafter, some embodiments of the present disclosure are described in detail with reference to accompanying drawings. In adding the reference numerals to the components of each drawing, it should be noted that an identical or equivalent component is designated by an identical numeral even when they are displayed on other drawings. Further, in describing an embodiment of the present disclosure, a detailed description of well-known features or functions has been omitted in order not to unnecessarily obscure the gist of the present disclosure In describing the components of the embodiment according to the present disclosure, terms such as first, second, "A", "B", (a), (b), and the like may be used. These terms are merely intended to distinguish one component from another component. Such terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application FIG. 1 is a view illustrating a configuration of a vehicle charging system, according to an embodiment of the present disclosure. FIG. 2 is a block diagram illustrating a vehicle illustrated in FIG. 1. FIG. 3 is a block diagram illustrating an apparatus for automatically charging the vehicle illustrated in FIG. 1.

The vehicle charging system includes a vehicle 100 and an apparatus (hereinafter, referred to as a "vehicle charging apparatus" in brief) 200 for automatically charging the vehicle 100. The vehicle 100 and the vehicle charging apparatus 200 are connected to each other over a communication network. The communication network may be implemented with at least one of communication technologies such as Wireless Internet, Short-Range Wireless Communication, Mobile Communication, and Wired Internet. Wireless Internet may include Wireless LAN (WLAN; WI-Fi), Wireless Broadband (Wibro), and World Interoperability for Microwave Access). Short-Range Wireless Communication may include Bluetooth, Near Field Communication (NFC), Radio Frequency Identification (RFID), Infrared Data Association (IrDA), Ultra Wideband (UWB), or Zig-Bee. Mobile Communication may include Code Division Multiple Access (CDMA), Global System for Mobile communication (GSM), Long Term Evolution (LTE), and International Mobile Telecommunication (IMT)-2020. Wired Internet may include Local Area Network (LAN), Wide Area Network (WAN), Ethernet, and/or Integrated Services Digital Network (ISDN).

The vehicle 100 may include Electric Vehicle (EV) or a Hybrid Electric Vehicle (HEV) employing electric energy stored in a battery 160 as driving power. In addition, the vehicle 100 may be a vehicle configured to perform self-driving. The vehicle 100 is parked in a parking space when the vehicle 100 arrives at a charging station and recognizes a relative position of the vehicle 100 based on a specific position (in other words, a reference position) of the parking space. The vehicle 100 transmits the recognized relative position to the vehicle charging apparatus 200. The vehicle 100 includes a communication device 110, a detector 120, a memory 130, a charging port 140, a charging controller 150, a battery 160, and a processor 170 as illustrated in FIG. 2.

The communication device 110 allows the vehicle 100 to communicate with the vehicle charging apparatus 200. The communication device 110 transmits vehicle information and/or parking information to the vehicle charging apparatus 200 under an instruction of the processor 170.

The detector 120 is connected to various sensors, an electronic control unit (ECU), and a navigation terminal, which are mounted in the vehicle 100, through In-Vehicle Network. The In-Vehicle Network may be implemented with Controller Area Network (CAN), Media Oriented Systems Transport (MOST), Local Interconnect Network (LIN), and/or X-by-Wire (Flexray).

The detector 120 acquires parking information based on at least one of in-vehicle devices, such as various sensors, electronic controllers, and/or navigation terminals. In this embodiment, the various sensors include a speed sensor, a steering angle sensor, Radio Detecting And Ranging, (radar), Light Detection And Ranging (LiDAR), an ultrasonic sensor, and an image sensor. The electronic controllers include Engine Control Unit (ECU), Transmission Control Unit (TCU), Brake Control Unit (BCU), and Battery Management System (BMS). The parking information includes a parking position and a parking posture based on a preset parking space in the charging station.

For example, the detector 120 recognizes a specific marker marked on the parking space through a camera (in other words, an image sensor). The detector 120 calculates relative coordinates (relative position) of the vehicle 100 by employing the recognized position of the marker as a reference position. In addition, the detector 120 calculates an alignment state (in other words, a parking posture) of the vehicle 100 in the parking space, for example, information on Six Degree of Freedom (6 DoF) through a camera and/or a laser. In this embodiment, the information on 6 DoF includes x-axis, y-axis, and z-axis coordinates, which are yaw information, pitch information, roll information, and translation information.

The memory 130 may store a program programmed such that the processor 170 performs a preset operation. The memory 130 may temporarily store input data and/or output data of the processor 170. The memory 130 may include vehicle information and parking information acquired through the detector 120. The vehicle information may include vehicle identification information, a vehicle model, a position (charging port cover position) of a charging port cover, a shape of the charging port cover, a position (charging port position) of a charging port, and a type of the charging port.

The memory 130 may be implemented with at least one storage medium (recording medium) of storage media (recording media), such as a flash memory, a hard disk, a Security Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, and the like The charging port 140 is a connection mechanism for connecting with a charging plug 250 of the vehicle charging apparatus 200. The charging port 140 receives charging power applied through the charging plug 250 while being connected to the charging plug 250.

The charging controller 150 charges the battery 160 with the charging power supplied from the outside through the charging port 140. The charging controller 150 monitors the charging amount (a battery residual amount) and a battery state (overvoltage, overcurrent, overheating, etc.) of the battery 160 in real time. The charging controller 150 may include an overcharge prevention circuit. The charging controller 150 may be implemented with a battery management system (BMS). The charging controller 150 may include a power transformer to transform charging power, such as a supply voltage and/or a supply current, supplied through the charging port 140, into a charging voltage and/or a charging current.

The battery 160 is mounted on the vehicle 100 to store electrical energy required for driving the vehicle 100. The battery 160 may be implemented with a high-output high-capacity high-voltage battery. The battery supplies operating power necessary for the operation of a driving motor in the vehicle 100.

The processor 170 controls the operations of the components, in other words, the communication device 110, the detector 120, the memory 130, and the charging controller 150. The processor 170 may include at least one of an Application Specific Integrated Circuit (ASIC), a Digital Signal Processor (DSP), Programmable Logic Devices (PLD), Field Programmable Gate Arrays (FPGAs), a Central Processing unit (CPU), microcontrollers, and/or microprocessors.

The processor 170 may determine whether the vehicle 100 is parked, based on at least one of a gearshift lever position, a vehicle speed, and/or a starting state. The processor 170 may transmit the vehicle information to the vehicle charging apparatus 200 through the communication device 110 in the state that the vehicle 100 is parked. In addition, the processor 170 may transmit the parking information (e.g., the parking position and the parking posture) acquired through the detector 120 together with the vehicle information.

When the vehicle 100 enters the charging station, the vehicle charging apparatus 200 recognizes the charging port 140 of the vehicle 100. the vehicle charging apparatus 200 controls a robotic arm and inserts the charging plug 250 into the charging port 140. By such a structure, the battery 160 of the vehicle 100 is charged. The vehicle charging apparatus 200 may be a charging robot (robotic charger) configured to automatically perform a charging process of charging the battery 160 of the vehicle 100.

Referring to FIG. 3, the vehicle charging apparatus 200 includes a communication device 210, a sensor 220, a memory 230, a power supply 240, a charging plug 250, a manipulator 260, a driving device 270, and a processor 280.

The communication device 210 allows the vehicle charging apparatus 200 to communicate with the vehicle 100 and/or an infrastructure in the charging station. The communication device 210 may receive the vehicle information, or the vehicle information and the parking information from the vehicle 100. In addition, the communication device 210 may receive the parking information from the infrastructure (not illustrated). The infrastructure may recognize the parking position and the vehicle model of the vehicle 100 through a camera mounted on the ceiling of the charging station. The infrastructure may estimate the parking posture of the vehicle 100 by recognizing the contact surface of wheels (four wheels) through a sensor (e.g. a touch sensor, or the like) placed on the floor of the charging station. The infrastructure may acquire parking information, such as the parking position and the parking posture, of the vehicle 100 using sensors (not illustrated) mounted in the charging station. The infrastructure may transmit the parking information to the vehicle charging apparatus 200.

The sensor 220 senses whether the vehicle 100 is parked in a preset parking position in the charging station. In other words, the sensor 220 may determine whether the vehicle 100 is parked in the parking space.

The sensor 220 acquires charging port information to exactly recognize the charging port 140 of the vehicle 100. For example, the sensor 220 acquires an image obtained by photographing the charging port 140 through the camera.

The memory 230 may store software programmed such that the processor 280 performs a preset operation. The memory 230 may store input data and/or output data of the processor 280. The memory 230 stores information on a charging port position depending on the vehicle model and the position of the vehicle charging apparatus 200 based on a reference position. In this embodiment, the information on the charging port position depending on the vehicle model is a coordinate relationship ($T_1$) between the charging port and the vehicle (vehicle center). The position of the vehicle charging apparatus 200 is a coordinate relationship ($T_3$) between the reference position and the vehicle charging apparatus 200.

The memory 230 may be implemented with at least one storage medium (recording medium) of storage media, such as a flash memory, a hard disk, a Security Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, a detachable disk, and a web storage.

The power supply 240 supplies charging power for charging the battery 160 of the vehicle 100. The power supply 240 receives external power. The power supply 240 also changes and outputs the external power as the charging power at a setting level. The setting level refers to a rated voltage and/or a rated current for charging the battery 160 of the vehicle 100.

The power supply 240 may include a converter (not illustrated) and/or an inverter to convert a voltage and/or a current of the external power into a rated voltage and/or a rated current of the battery 160. The convert may include a buck converter, a boost converter, and/or a buck-boost converter.

The charging plug 250 is a connection mechanism for connecting with the charging port 140 of the vehicle 100. When the charging plug 250 is connected to the charging port 140 of the vehicle 100, the charging plug 250 is electrically connected to the charging port 140. In addition, the charging plug 250 is connected to the power supply 240 through a cable and provides (transmits) the charging power supplied from the power supply 240 to the vehicle 100.

The manipulator 260 moves the charging plug 250 to the charging port 140 of the vehicle 100 and inserts (combines) the charging plug 250 into the charging port 140. The manipulator 260 may be implemented in the form of a robot arm. In addition, the manipulator 260 may be implemented in a form structurally coupled with the sensor 220 and/or the charging plug 250. For example, a camera and/or the charging plug 250 may be disposed (mounted) at the end of the manipulator 260.

The driving device 270 controls the operation (driving) of the manipulator 260. The driving device 270 controls the manipulator 260, depending on optimal trajectory information generated based on the position information of the charging port 140 to move the charging plug 250, to the charging port 140.

The processor 280 controls the overall operation of the vehicle charging apparatus 200. The processor 280 may include at least one of an Application Specific Integrated Circuit (ASIC), a Digital Signal Processor (DSP), a Programmable Logic Device (PLD), Field Programmable Gate Arrays (FPGAs), a Central Processing unit (CPU), microcontrollers, and/or microprocessors.

The processor 280 recognizes the vehicle 100 parked in a preset parking space, when the vehicle 100 is parked in the preset parking space. The processor 280 may recognize parking using a parking recognizing device (not illustrated) installed in the parking space of the charging station or sensors mounted on the vehicle 100. For example, when contacting a portion of a vehicle body of the vehicle 100, the parking recognizing device senses the contact with the vehicle body and notifies the processor 280 of the parking of the vehicle 100. In another embodiment, when a user manipulates a charging starting button (not illustrated) provided in the vehicle charging apparatus 200 after parking the vehicle 100 in the parking space, the processor 280 may communicate with the vehicle 100 through the communication device 210. Then the processor 280 may recognize the parking using the sensors (e.g. a gearshift lever position sensor, a vehicle speed sensor, and/or a starting device) mounted in the vehicle 100.

The processor 280 obtains vehicle information and parking information through the communication device 210. The vehicle information may include vehicle identification information (e.g. a vehicle number), a vehicle model, the position of a charging port cover, the position of a charging port, and the type of the charging port. The parking information may include a parking position and a parking posture. In this embodiment, the parking position, which is a vehicle position based on the reference position, refers to a coordinate relationship ($T_2$) between the reference position and the vehicle. The processor 280 may obtain the vehicle information and the parking information from the vehicle 100 and/or the infrastructure. The vehicle 100 detects the parking position and the parking posture of the vehicle 100 through the sensors mounted in the vehicle body. The vehicle 100 transmits the parking position and the parking posture to the vehicle charging apparatus 200. The infrastructure may recognize the parking position and the parking posture of the vehicle 100 through the sensors (e.g., a camera and/or an ultrasonic sensor) mounted in the charging station. The infrastructure may transmit the recognized parking position and the parking posture to the processor 280.

The processor 280 calculates a position (vehicle position) of the vehicle 100 based on the vehicle information and the parking information. The vehicle position may be a relative position or an absolute position based on the vehicle charging apparatus 200. In other words, the processor 280 may estimate the positions (position relationship) of the vehicle 100 and the vehicle charging apparatus 200 based on the vehicle information and the parking information. The processor 280 reads, from the memory 230, the charging port position information ($T_1$) of the vehicle 100 based on the vehicle model of the vehicle 100 according to the vehicle information. In addition, the processor 280 reads the position ($T_3$) of the vehicle charging apparatus 200 based on the reference position from the memory 230. The processor 280 may identify the position relationship between the vehicle 100 and the vehicle charging apparatus 200 using the parking position ($T_2$) of the vehicle 100 and the position ($T_3$) of the vehicle charging apparatus 200.

In addition, the processor 280 may calculate a coordinate relationship (T) between the charging port 140 and the vehicle charging apparatus 200 based on the charging port position information ($T_1$), the parking position ($T_2$) of the vehicle 100, and the position ($T_3$) of the vehicle charging apparatus 200. The coordinate relationship (T) between the charging port 140 and the vehicle charging apparatus 200 may be expressed as in Equation 1.

$$T = T_1 \cdot T_2 \cdot T_3 \qquad \text{Equation 1}$$

The processor 280 recognizes the charging port 140 based on the vehicle position. The processor 280 selects an initial position for charging. The processor 280 controls the driving device 270 based on the coordinate relationship (T) between the charging port 140 and the vehicle charging apparatus 200. The processor 280 controls the driving device 270 and moves the manipulator 260 to the selected initial position. In other words, the processor 280 controls the manipulator 260 to move the charging plug 250 to the initial position. The initial position is a position spaced apart from an estimated position of the charging port cover by a set distance. In this embodiment, the initial position has to be spaced apart from the estimated position by a distance or more to prevent the charging port cover from being interrupted.

The processor 280 may estimate the position of the charging port cover based on the coordinate relationship (T) between the charging port 140 and the vehicle charging apparatus 200. In another embodiment, the processor 280 may estimate the charging port position by utilizing the charging port cover position information previously stored in the memory 230 and the coordinate relationship (T) between the charging port 140 and the vehicle charging apparatus 200. The processor 280 may calculate (generate) an optimal trajectory (a first optimal trajectory) of the manipulator 260 based on the charging port cover position. In this embodiment, the optimal trajectory may be the shortest moving path from the initial position to the charging port cover position or a path suitable for making an insertion angle of the charging plug 250. The processor 280 controls the driving device 270 based on the optimal trajectory and moves the manipulator 260 to the charging port cover position. The processor 280 recognizes the charging port cover by the sensor 220, for example, a camera positioned at the end of the manipulator 260. The processor 280 corrects the charging port cover position based on the recognized information and moves the manipulator 260. The processor 280 moves the manipulator 260 to the initial position at a first moving speed. The processor 280 moves the manipulator 260 to the charging port cover position, in other words, the final position from the initial position at a second moving speed slower than the first moving speed.

After recognizing the charging port cover position, the processor 280 may request the vehicle 100 to open the charging port cover through the communication device 210. When the charging cover is opened, the processor 280 calculates the optimal trajectory (a second optimal trajectory) of the manipulator 260 based on the charging port position information ($T_1$) and the coordinate relationship (T) between the charging port 140 and the vehicle charging apparatus 200. In this embodiment, the second optimal trajectory refers to the final trajectory to the charging port 140 from an arrival position of the manipulator 250 along the first optimal trajectory. In this embodiment, the processor 280 may calculate the insertion angle (the connection angle of the charging port 140) of the charging plug 250.

The processor 280 provides the calculated optimal trajectory to the driving device 270. The driving device 270 controls the manipulator 260 according to the optimal trajectory to move the charging plug 250 to the charging port 140. In this embodiment, the processor 280 corrects a position error of the charging port 140 through the sensor 220 and moves the charging plug 250.

When the charging plug 250 arrives at the corrected position of the charging port 140, the processor 280 controls the manipulator 260 to insert the charging plug 250 into the charging port 140. The processor 280 controls the power supply 240 to supply the charging power to the vehicle 100 when recognizing the connection between the charging plug 250 and the charging port 140. The vehicle 100 receives the charging power to charge the battery 160.

The processor 280 communicates with the vehicle 100 and monitors the charging state of the battery 160 while charging the battery 160 of the vehicle 100. When receiving a full charging signal from the vehicle 100, the processor 280 stops supplying the charging power and controls the manipulator 260 to remove the charging plug 250 from the charging port 140 of the vehicle 100. Then, the processor 280 moves the manipulator 260 to the initial position. In addition, the processor 280 requests the vehicle 100 to close the charging port cover, confirms the closing of the charging port cover, and then returns the manipulator 260 to a specific point (the original position).

The processor 280 rapidly moves the manipulator 260 to the initial position. The processor 280 moves the manipulator 260 to the position (in other words, the final position) of the charging port 140 from the initial position more slowly than the movement to the initial position.

Figure 4:
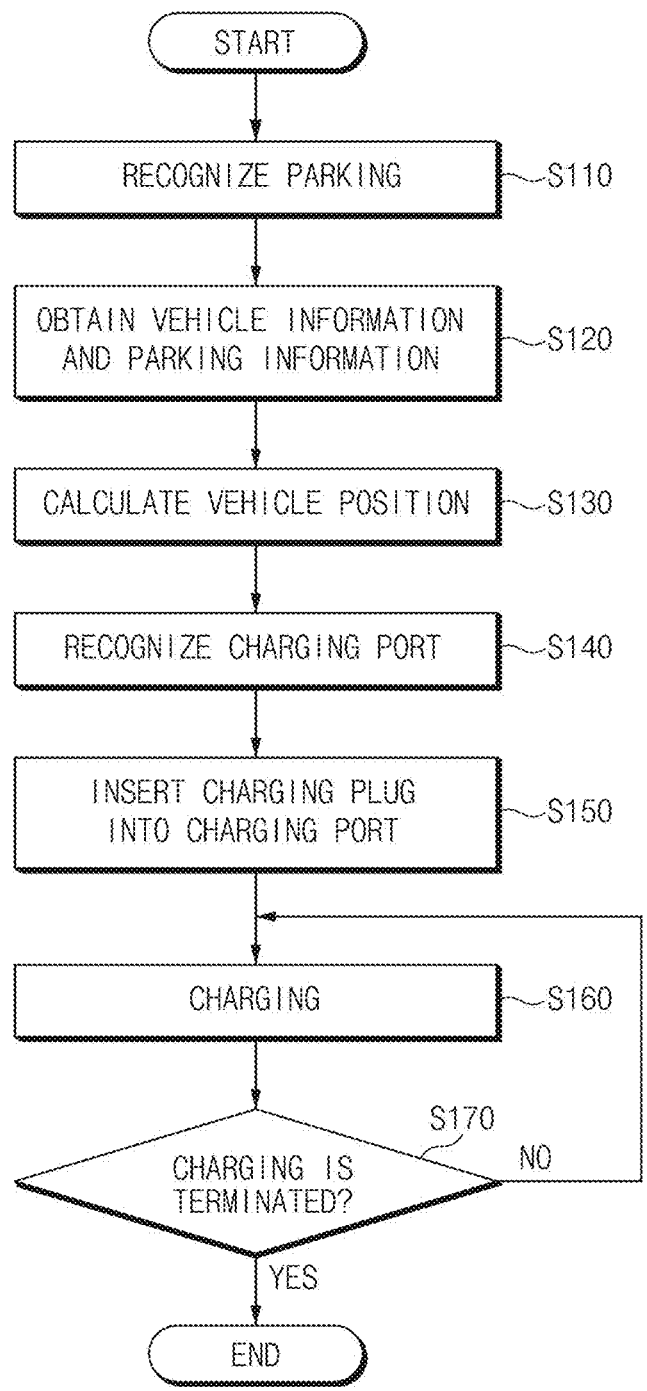
FIG. 4 is a flowchart illustrating a method for automatically charging the vehicle, according to an embodiment of the present disclosure.
Figure 5:
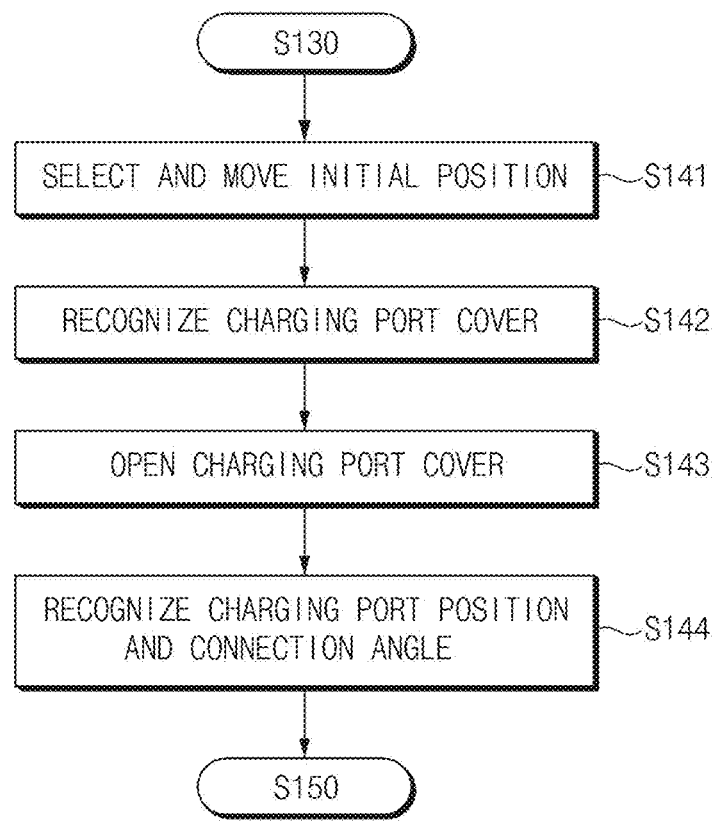
FIG. 5 is a flowchart illustrating the procedure of recognizing a charging port illustrated in FIG. 4.

FIG. 4 is a flowchart illustrating a method for automatically charging a vehicle, according to an embodiment of the present disclosure and FIG. 5 is a flowchart illustrating the procedure of recognizing a charging port illustrated in FIG. 4.

Referring to FIG. 4, the processor 280 of the vehicle charging apparatus 200 recognizes parking when the vehicle 100 parks in a parking space within a charging station (S110). The processor 280 may recognize the parking through a recognition device (not illustrated) installed in the parking space or may recognize the parking through communication with the vehicle 100.

The processor 280 obtains vehicle information and parking information of the vehicle 100 through the communication device 210 (S120). The vehicle information may include vehicle identification information, a vehicle model, a position of a charging port cover, a shape of the charging port cover, a position of a charging port, and the type of the charging port. The parking information may include a parking position (the coordinate relationship (T2) between the reference position and the vehicle 100) and a parking posture (e.g. information on 6 DoF). The processor 280 may receive the vehicle information from the vehicle 100 and may obtain the parking information from the vehicle 100 and/or infrastructure (not illustrated).

The processor 280 calculates a position (vehicle position) of the vehicle 100 based on the obtained vehicle information and the obtained parking information. In other words, the processor 280 may estimate the position relationship between of the vehicle 100 and the vehicle charging apparatus 200 based on the vehicle information and the parking information. For example, the processor 280 may estimate the position relationship between the vehicle 100 and the vehicle charging apparatus 200. The estimation is performed by using the coordinate relationship ($T_2$) between the reference position of the vehicle 100 and the vehicle 100 and the coordinate relationship ($T_3$) of the vehicle charging apparatus 200 based on the reference position previously stored in the memory 230.

The processor 280 recognizes the charging port 140 of the vehicle 100 based on the position of the vehicle 100 (S140). Referring to FIG. 5, the processor 280 selects the initial position based on the position of the vehicle 100 and moves the manipulator 260 to the initial position (S141). The processor 280 reads, from the memory 230, the charging port position information ($T_1$) of the vehicle 100 based on the vehicle model of the vehicle 100 according to the vehicle information. The processor 280 may calculate the coordinate relationship (T) between the charging port 140 and the vehicle charging apparatus 200 based on the charging port position information ($T_1$) based on the vehicle model of the vehicle 100, the parking position ($T_2$) of the vehicle 100, and the position ($T_3$) of vehicle charging apparatus 200. The processor 280 selects an initial position for charging and controls the driving device 270 based on the coordinate relationship (T) between the charging port 140 and the vehicle charging apparatus 200. The processor 280 controls the driving device 270 and moves the manipulator 260 to the selected initial position.

Then, the processor 280 estimates the charging port cover position and moves the manipulator 260 to the estimated charging port cover position to recognize the charging port cover (S142). The processor 280 may estimate the charging port cover position based on charging port position information ($T_1$) and the coordinate relationship (T) between the charging port 140 and the vehicle charging apparatus 200. In another embodiment, the processor 280 may estimate the charging port cover position by using the charging port cover position information previously stored in the memory 230 and the coordinate relationship (T) between the charging port 140 and the vehicle charging apparatus 200. The processor 280 calculates (generates) the optimal trajectory (the first optimal trajectory) from the initial position to the estimated charging port cover position. When moving the manipulator 260 to the charging port cover position along the optimal trajectory, the processor 280 may recognize the charging port cover through the sensor 220 and correct the charging port cover position.

The processor 280 recognizes the charging port cover and allows the vehicle 100 to open the charging port cover (S143). The processor 280 requests the vehicle 100 to open the charging port cover through the communication device 210. The processor 170 of the vehicle 100 opens the charging port cover in response to the request of the vehicle charging apparatus 200.

The processor 280 recognizes the charging port 140 when the charging port cover is opened (S144). The processor 280 calculates the optimal trajectory (the second optimal trajectory) of the manipulator 260. The calculation is based on the charging port position information ($T_1$) and the coordinate relationship (T) between the charging port 140 and the vehicle charging apparatus 200. In this embodiment, the processor 280 may calculate the insertion angle of the charging plug 250

The processor 280 controls the manipulator 260 to insert the charging plug 250 into the charging port 140 (S150). The processor 280 provides the calculated optimal trajectory to the driving device 270. The driving device 270 controls the manipulator 260 according to the optimal trajectory to move the charging plug 250 to the charging port 140 of the vehicle 100. In this embodiment, the processor 280 corrects the position error of the charging port 140 through the sensor 220 and moves the charging plug 250. When the charging plug 250 arrives at the corrected position of the charging port 140, the processor 280 controls the manipulator 260 to insert the charging plug 250 into the charging port 140.

The processor 280 charges the battery 160 by supplying the charging power to the vehicle 100 when the charging plug 250 is connected with the charging port 140.

The processor 280 determines whether charging is terminated (S170). The processor 280 communicates with the vehicle 100 and monitors the charging state of the battery 160 while charging the battery 160 of the vehicle 100. When receiving the full charging signal from the vehicle 100, the processor 280 stops supplying the charging power and controls the manipulator 260 to remove the charging plug 250 from the charging port 140 of the vehicle 100. Then the processor 280 moves the manipulator 260 to the initial position. In addition, the processor 280 requests the vehicle 100 to close the charging port cover, confirms the closing of the charging port cover, and then returns the manipulator 260 to a specific point (the original position).

Figure 6:
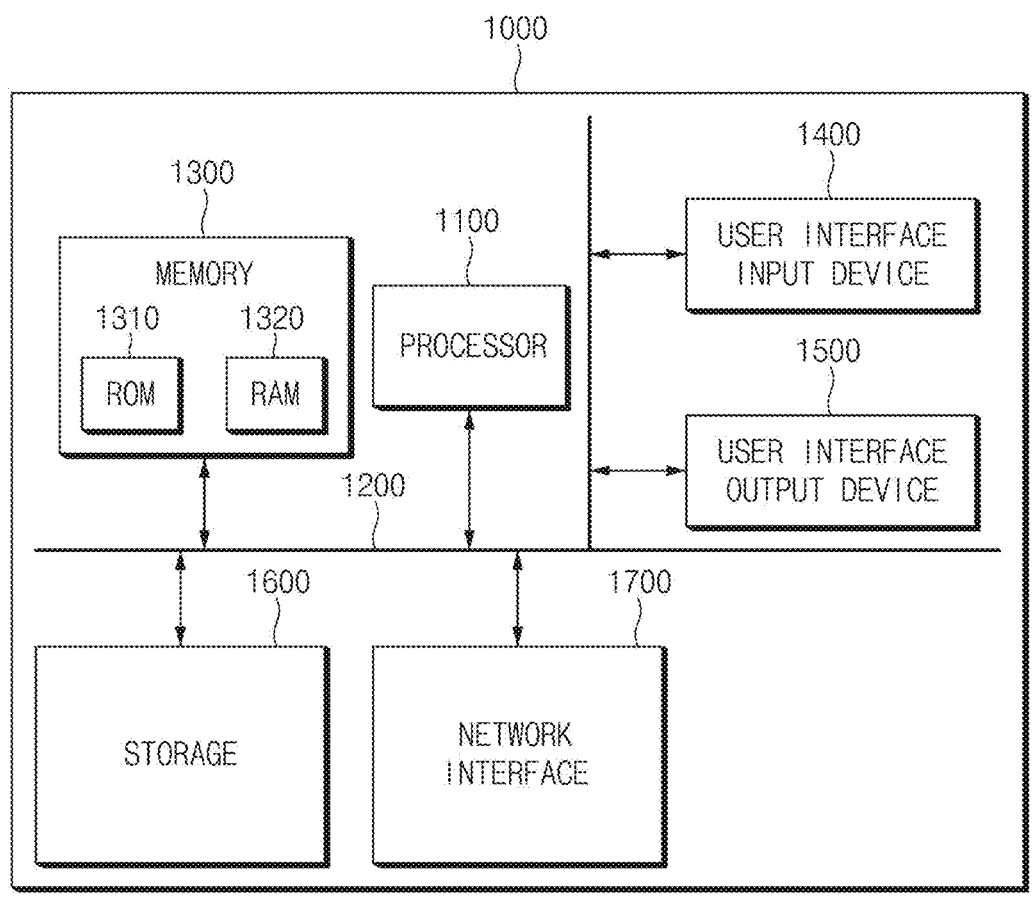
FIG. 6 is a block diagram illustrating a computing system to execute the method for automatically charging the vehicle, according to an embodiment of the present disclosure.

FIG. 6 is a block diagram illustrating a computing system to execute the method for automatically charging the vehicle, according to an embodiment of the present disclosure.

Referring to FIG. 6, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM; see 1310) and a random-access memory (RAM; see 1320).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e. the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. In another embodiment, the storage medium may be integrated with the processor 1100. The processor 1100 and storage medium may reside in an application specific integrated circuit (ASIC). The ASIC may reside in a user terminal. In another embodiment, the processor 100 and the storage medium may reside as separate components of the terminal of the user.

According to the present disclosure, because the charging port is recognized based on the data measured by the sensors mounted on the vehicle, the recognition rate of the charging port may be improved without adding a separate sensor to recognize the charging port. The degree of freedom is not excessively required to find the charging port.

Hereinabove, although the present disclosure has been described with reference to specific embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims. Therefore, the specific embodiments of the present disclosure are provided to explain the spirit and scope of the present disclosure, but not to limit them. Thus, the spirit and scope of the present disclosure is not limited by the embodiments. The scope of the present disclosure should be construed on the basis of the accompanying claims. All the technical ideas within the scope equivalent to the claims should be included in the scope of the present disclosure.

What is claimed is:

1. An apparatus for automatically charging a vehicle, the apparatus comprising:
    a charging plug configured to connect to a charging port of the vehicle;
    a manipulator configured to move the charging plug to the charging port of the vehicle;
    a power supply connected with the charging plug and configured to supply charging power to the vehicle; and
    a processor configured to:
        obtain vehicle information and parking information through a communication with the vehicle when recognizing parking of the vehicle;
        calculate a vehicle position using the vehicle information and the parking information;
        select an initial position for charging of a battery of the vehicle based on the calculated vehicle position;
        recognize the charging port of the vehicle based on the calculated vehicle position;
        calculate an optimal trajectory from the initial position to a previously stored position of a charging port cover based on the position of the charging port cover;
        control the manipulator along the optimal trajectory to move the charging plug to the position of the charging port cover; and
        control the manipulator to connect the charging plug to the charging port of the vehicle such that the battery of the vehicle is charged.

2. The apparatus of claim 1, wherein the processor is further configured to:
    recognize that the vehicle is parked in a preset parking space through sensors mounted in at least one of the vehicle or an infrastructure.

3. The apparatus of claim 2, wherein the vehicle is configured to calculate a relative position of the vehicle with respect to a reference position of the preset parking space using the sensors mounted in a vehicle body and configured to provide the calculated relative position of the vehicle to the processor.

4. The apparatus of claim 3, wherein the processor is further configured to:
    calculate the vehicle position by using the calculated relative position of the vehicle and a position of the apparatus based on the reference position of the preset parking space, which is previously stored.

5. The apparatus of claim 4, wherein the processor is further configured to:
    calculate a position relationship between the charging port of the vehicle and the apparatus using the vehicle position and a position of the charging port of the vehicle.

6. The apparatus of claim 5, wherein the processor is further configured to:
    control the manipulator to move the charging plug to the initial position.

7. The apparatus of claim 6, wherein the processor is further configured to:
    move the manipulator to the initial position at a first moving speed; and
    move the manipulator to the position of the charging port cover from the initial position at a second moving speed slower than the first moving speed.

8. The apparatus of claim 6, wherein the processor is further configured to:
    recognize the charging port cover through a camera mounted at an end portion of the manipulator;
    request the vehicle to open the charging port cover; and
    recognize a position and a connection angle of the charging port of the vehicle.

9. The apparatus of claim 1, wherein the vehicle information includes at least one of vehicle identification information, a vehicle model, a position of the charging port cover, a shape of the charging port cover, a position of the charging port of the vehicle, or a type of the charging port of the vehicle.

10. The apparatus of claim 1, wherein the parking information includes a parking position and a parking posture.

11. An apparatus for automatically charging a vehicle, the apparatus comprising:
    a charging plug configured to connect to a charging port of the vehicle;
    a manipulator configured to move the charging plug to the charging port of the vehicle;
    a power supply connected with the charging plug and configured to supply charging power to the vehicle; and
    a processor configured to:
        obtain vehicle information through a communication with the vehicle when recognizing parking of the vehicle and parking information through a communication with an infrastructure;
calculate a vehicle position using the vehicle information and the parking information;
select an initial position for charging of a battery of the vehicle based on the calculated vehicle position;
recognize the charging port of the vehicle based on the calculated vehicle position;
calculate an optimal trajectory from the initial position to a previously stored position of a charging port cover based on the position of the charging port cover;
control the manipulator along the optimal trajectory to move the charging plug to the position of the charging port cover; and
control the manipulator to connect the charging plug to the charging port of the vehicle such that the battery of the vehicle is charged.

12. A method for automatically charging a vehicle, the method comprising:
recognizing, by a processor, parking of the vehicle;
obtaining, by the processor, vehicle information and parking information through a communication with the vehicle;
calculating, by the processor, a vehicle position using the vehicle information and the parking information;
selecting, by the processor, an initial position for charging of a battery of the vehicle based on the calculated vehicle position;
recognizing, by the processor, a charging port of the vehicle based on the calculated vehicle position;
calculating an optimal trajectory from the initial position to a previously stored position of the charging port cover based on the position of the charging port cover;
controlling the manipulator along the optimal trajectory to move the charging plug to the position of the charging port cover; and
controlling, by the processor, a manipulator to connect a charging plug to the charging port of the vehicle such that the battery of the vehicle is charged.

13. The method of claim 12, wherein the recognizing of the parking includes:
recognizing, by the processor, that the vehicle is parked in a preset parking space through sensors mounted in at least one of the vehicle or an infrastructure.

14. The method of claim 12, wherein the obtaining of the vehicle information and the parking information includes:

calculating, by the vehicle, a relative position of the vehicle with respect to a reference position of a preset parking space using sensors mounted in a vehicle body; and
providing the calculated relative position of the vehicle to the processor.

15. The method of claim 14, wherein the calculating of the vehicle position includes:
calculating, by the processor, the vehicle position by using the calculated relative position of the vehicle and a position of an apparatus, which includes the processor, based on the reference position of the preset parking space, which is previously stored.

16. The method of claim 15, wherein the recognizing of the charging port of the vehicle includes:
calculating, by the processor, a position relationship between the charging port of the vehicle and the apparatus using the vehicle position and a position of the charging port of the vehicle.

17. The method of claim 15, wherein the recognizing of the charging port of the vehicle includes:
controlling the manipulator to move the charging plug to the initial position;
recognizing the charging port cover through a camera mounted at an end portion of the manipulator;
requesting the vehicle to open the charging port cover; and
recognizing a position and a connection angle of the charging port of the vehicle when the charging port cover is opened.

18. The method of claim 12, wherein the vehicle information includes at least one of vehicle identification information, a vehicle model, a position of the charging port cover, a shape of the charging port cover, a position of the charging port of the vehicle, or a type of the charging port of the vehicle.

19. The method of claim 12, wherein the parking information includes a parking position and a parking posture.

20. The method of claim 12, further comprising:
stopping, by the processor, supplying charging power when the processor receives a full charging signal from the vehicle after charging the battery of the vehicle from the charging port of the vehicle; and
controlling the manipulator to remove the charging plug from the charging port of the vehicle.

* * * * *